Patented Oct. 13, 1931

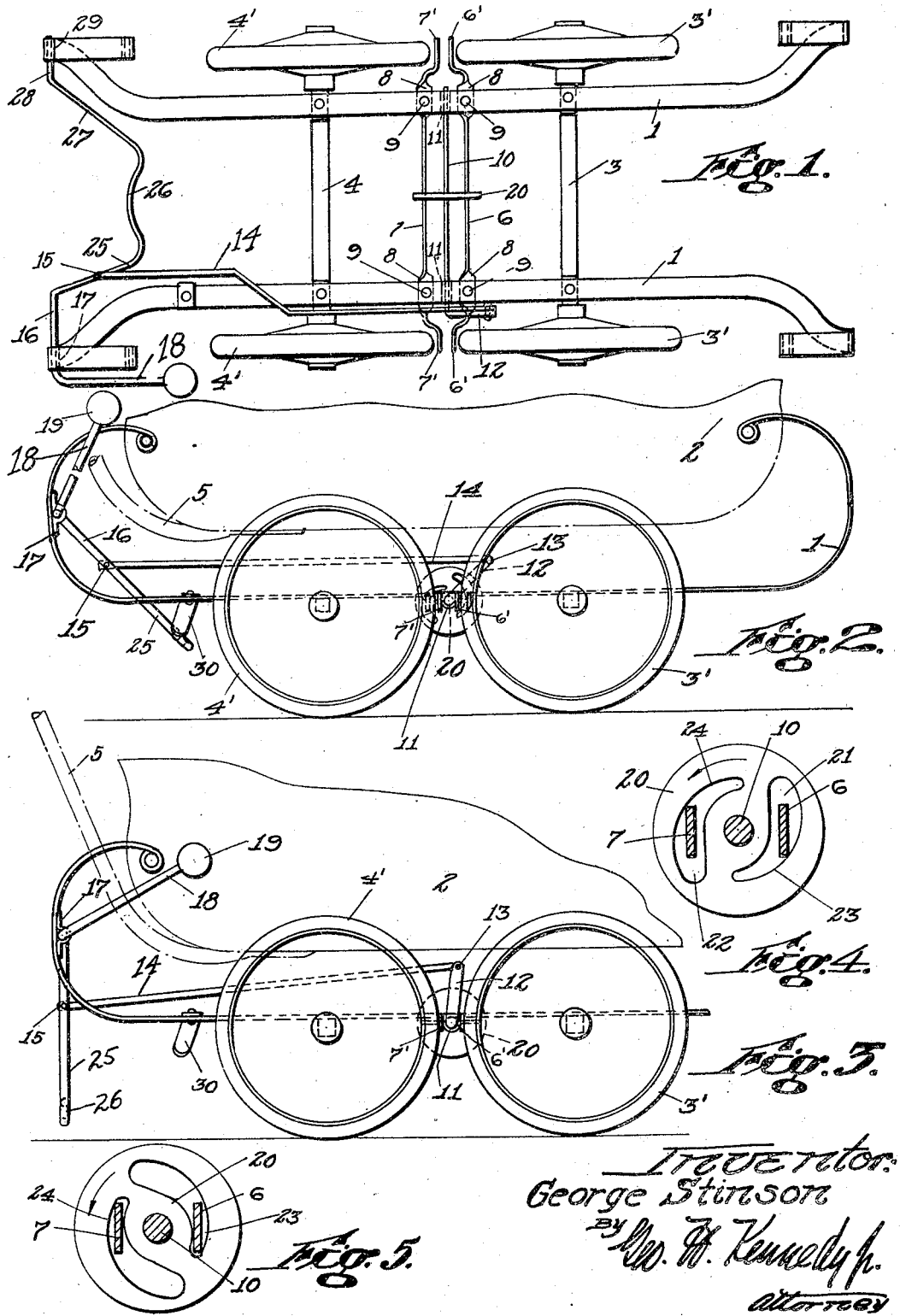

1,827,492

UNITED STATES PATENT OFFICE

GEORGE STINSON, OF GARDNER, MASSACHUSETTS, ASSIGNOR TO HEYWOOD-WAKEFIELD COMPANY, OF BOSTON, MASSACHUSETTS, A CORPORATION OF MASSACHUSETTS

RUNNING GEAR FOR BABY CARRIAGES

Application filed March 20, 1930. Serial No. 437,519.

The present invention relates generally to a baby carriage chassis or running gear, and has particular reference to the braking instrumentalities thereof, as well as to certain safety mechanism brought into operation by the act of setting the brakes for preventing the carriage, when stationary, from being tipped over.

The invention resides in a novel and simplified braking mechanism, applicable to all four wheels of the carriage, and also in the combination with brake-operating means, of a safety or anti-tipping member, which itself is so constructed as to serve, when desired, as a foot-operated means for operating the brakes. Other and further objects and advantages of the invention will be made apparent in the following detailed description thereof, reference being had in this connection to the accompanying drawings, wherein Fig. 1 is a top plan view of baby carriage running gear having my invention applied thereto.

Fig. 2 is a view of said running gear in side elevation, and showing the parts in the released condition of the brakes.

Fig. 3 is a view similar to Fig. 2, showing the parts in the positions assumed when the brakes are set.

Fig. 4 is a large scale fragmentary view illustrating the oscillatory disk that constitutes the brake actuator.

Fig. 5 is a view similar to Fig. 4, showing the disk when turned to brake-setting position.

Like reference characters refer to like parts in the different figures.

The chassis or running gear of the carriage is here shown as comprising a pair of longitudinal side members 1, 1, preferably of suitable resilient material so that the outwardly and upwardly turned ends of said members may provide a spring support for the body 2 of the carriage, as shown. Extending transversely of the side members 1, 1, and secured thereto in any suitable manner, are the front and rear axles 3 and 4, respectively, on which are mounted the front wheels 3', 3' and the rear wheels 4', 4'. Extending rearwardly from the body 2 is the usual handle bar 5, by which the carriage may be propelled forwardly on the wheels 3', 4' by a person walking directly behind the carriage and pushing against said handle bar.

The carriage, as shown, is provided with a front wheel braking member 6, and a rear wheel braking member 7, each of these two members being a relatively thin flexible metal strip that extends transversely of the frame members 1, 1, and projects at its ends beyond said frame members into the spaces between the tires or treads of the wheels 3' and 4'. The parallel strips or bars 6 and 7 stand edgewise throughout their lengths, except at their zones of intersection with the side members 1, 1; in these zones, the material of each strip is twisted through approximately ninety degrees to present an extended substantially flat surface 8 in opposition to the surface of the side member, and at these points of intersection are provided pivotal pins or rivets 9, 9 passing through the side members 1, 1 and the braking members 6 and 7, to fix the latter in position.

Extending transversely of the side members 1, 1, between the two braking bars 6 and 7, is a shaft 10, the latter adapted to oscillate in suitable bearings 11, 11 secured to each side member 1. At one end, said shaft 10 is bent substantially at right angles to provide an upwardly extending crank arm 12, and the free end of the latter has pivotally secured thereto, at 13, a rearwardly extending link 14. The rear end of link 14 has a pivotal connection at 15 with a bent or bell crank lever 16, arranged to swing on a substantially horizontal axis provided, as here shown, at the point where the material of said bent lever 16 crosses the adjacent side member 1, the latter having secured thereto a suitable bearing bracket 17 for this purpose. The upward extension 18 of said bent lever provides a knob or handle 19, in convenient reach of a person walking behind the carriage and propelling the same by the handle bar 5. The knob 19 normally is disposed in the position illustrated by Fig. 2, but when it is thrust forwardly and downwardly into the position of Fig. 3, it effects simultaneously the setting of braking member 6 to lock the two front wheels 3', 3', and the setting of braking member 7 to lock the two rear wheels 4', 4',—this occurring in the following manner:—

The shaft 10, substantially midway between the side members 1, 1, has secured thereto a disk 20, the latter, as best shown in Fig. 4, having a curved slot 21 therein for the passage of braking member 6, and also a curved slot 22 therein for the passage of braking member 7. Under normal conditions, with the operating lever 16, 18 in the position illustrated by Fig. 2, the angular position of the disk 20 is such that the curved edges 23 and 24 of slots 21 and 22, respectively, are substantially out of contact with the braking members 6 and 7. However, when the handle or lever is thrust downwardly and forwardly into the position shown by Fig. 3, the disk 20 undergoes a counterclockwise rotation that draws said edges 23 and 24 against the braking members 6 and 7, respectively, and inasmuch as said edges 23 and 24 are curved inwardly toward the center of the disk, they act as a pair of cams to forcibly flex the middle portions of the two members 6 and 7 inwardly, this action producing opposite turning movements about the pivots 9, 9 of sufficient amplitude to carry the free ends 6', 6' and 7', 7' of said members into snug frictional contact with the adjacent tires or treads of wheels 3', 3' and 4', 4', respectively.

In this way, by forward and downward rocking of lever 16, 18, the brakes are simultaneously set and locked against all four wheels of the carriage. Said carriage, according to the usual practice, is made with a relatively short wheel base, or distance between the axes of front and rear wheel axles 3 and 4, to permit of easy handling, especially as regards the necessity for tipping up the front end of the carriage, using the rear wheels as a fulcrum point, to surmount such obstacles as curbstones and the like in the normal forward propulsion of the carriage by the handle bar 5. On account of the relatively large overhang, for this purpose, of the carriage and the handle bar 5 beyond the rear axle 4, there is the possibility that if the attendant leaves the carriage with the brakes set, as above described, a child or other unauthorized person may exert sufficient downward pressure or pull on the handle bar 5 to tip the carriage over backwards. As a safeguard against any such happening, my invention provides that the act of setting the brakes (either the four wheel brakes as herein shown, or any other type of brakes) shall interpose a positive obstruction to such rearward tipping, this being effected in the following manner:—

As clearly shown in Fig. 1, the lever portion 16, below its point of pivotal attachment 15 with link 14, has a downward extension 25, at the lower end of which the material is bent to provide a transverse arm 26 and a portion 27 paralleling the extension 25, with a terminal 28 that crosses the opposite side member 1 and has a bearing thereon, in the form of a bracket 29, in substantial axial alinement with the bearing provided by bracket 17 on the other side member 1.

In the position shown by Fig. 2, with the brakes released, the depending member 25, 26, 27 occupies an out-of-the-way location beneath the body of the carriage, and preferably is held against accidental displacement from this location by frictional engagement with a spring arm 30 depending from one of the side members 1. The act of setting of the brakes forward and downward movement of the lever 16, 18 throws the member 25, 26, 27 (actually an extension of said lever) into the operative position shown in Fig. 3, where it stands as an obstacle to any rearward tipping of the carriage about the rear wheels as a fulcrum. In addition, said member 25, 26, 27 serves as a convenient means, supplementing the hand lever 18 and knob 19, for either setting or releasing the brakes, because of its being within easy reach of the foot of any one who stands behind the handle bar 5 in the operation of the carriage.

I claim,

1. Braking mechanism for a baby carriage or the like, comprising a pair of adjacent substantially parallel transverse braking members, each adapted by flexure to engage its ends with a pair of wheels of the carriage, a shaft extending transversely of the carriage between said members, and means carried by said shaft to flex both members when said shaft is rocked, thereby to obtain the braking of all four wheels of the carriage.

2. Braking mechanism for a baby carriage or the like, comprising a pair of adjacent substantially parallel transverse braking members, each adapted by flexure to engage its ends with a pair of wheels of the carriage, a shaft extending transversely of the carriage between said members, and a disk on said shaft, providing an elongated curved slot for the passage of each braking member, the edges of said slots, when said shaft is turned, procuring the flexure of said members in opposite directions.

3. In a baby carriage or the like, the combination with braking means for the wheels, and a hand lever for operating the same, of an extension on said lever which assumes, in the set condition of said braking means, a position wherein it obstructs tipping of the carriage about the rear wheels thereof as a fulcrum.

4. In a baby carriage or the like, the combination with braking means for the wheels, and a hand lever for operating the same, of an extension on said lever which assumes, in the set condition of said braking means, a position wherein it obstructs tipping of the carriage about the rear wheels thereof as a fulcrum, said extension serving also as a foot lever for the operation of said braking means.

GEORGE STINSON.